US006724770B1

(12) United States Patent
Van Renesse

(10) Patent No.: US 6,724,770 B1
(45) Date of Patent: Apr. 20, 2004

(54) MULTICAST PROTOCOL WITH REDUCED BUFFERING REQUIREMENTS

(75) Inventor: Robbert Van Renesse, Ithaca, NY (US)

(73) Assignee: Kenneth P. Birman, Ithaca, NY (US)

( * ) Notice: Subject to any disclaimer, the term of this patent is extended or adjusted under 35 U.S.C. 154(b) by 0 days.

(21) Appl. No.: 09/506,054

(22) Filed: Feb. 17, 2000

(51) Int. Cl.$^7$ ............................................... H04J 7/216
(52) U.S. Cl. ....................... 370/432; 370/312; 370/390; 711/211; 711/216
(58) Field of Search ................................ 370/389, 390, 370/394, 432, 312; 711/211, 212, 216, 217, 218

(56) References Cited

U.S. PATENT DOCUMENTS 6,185,698 B1 * 2/2001 Wesley et al. ................. 714/18
6,226,686 B1 * 5/2001 Rothschild et al. .......... 709/245
6,490,586 B1 * 12/2002 Goft et al. ..................... 707/10
6,529,953 B1 * 3/2003 Van Renesse ............... 709/223

OTHER PUBLICATIONS

Ozkasap Oznur et al: "Efficient Buffering in Reliable Multicast Protocols" First International Workshop on Networked Group Communication, Nov. 17–20, 1999, pages.
Birman Kenneth P et al: "Bicmodal Multicast" ACM Transactions on Computer Systems, vol. 17, No. 2, May 1999, pp. 41–88.

* cited by examiner

*Primary Examiner*—Alpus H. Hsu
*Assistant Examiner*—Thien Tran

(74) *Attorney, Agent, or Firm*—Cesari and McKenna, LLP

(57) ABSTRACT

A scalable multicast protocol buffers the multicast messages at a subset of "C" members, where C is selected to reduce to an acceptable level the probability that a given message will be lost before it reaches at least one of the C members. When a member receives a multicast message, the member determines whether or not it should buffer the message by manipulating a string of bytes that is unique to both the message and the member and determining if the result is less than a calculated value C/n, where "n" is the number of known members. When one of the C bufferers thereafter receives a gossip message that indicates that the multicast message has been lost to the gossiping member, the bufferer retransmits the message to the gossiping member. When a member that is not one of the C bufferers receives such a gossip message, the member determines which members are bufferers of the lost message and requests that one of the bufferers retransmit the message to the gossiping member. The selected member identifies the bufferers by manipulating the byte strings associated with the lost message and the respective members that are known to the selected member. The selected member then sends to one of the identified bufferers a request for retransmission of the lost message to the gossiping member. The multicast protocol may further include a mechanism to detect catastrophic failures in the multicast transmission. Each member includes the buffer discussed above and a relatively small, fixed-size "short-term" buffer that holds a limited number of the received messages in the order in which the messages are received. A member monitors any holes or gaps in the sequences of incoming messages, and detects a catastrophic failure when a received gossip message identifies one of the same holes or gaps. When such a failure is detected, the member sends a request for multicast retransmission of the associated missing message to the sender, and the sender multicasts the message to the group from the short term buffer.

12 Claims, 6 Drawing Sheets

MULTICAST PROTOCOL WITH REDUCED BUFFERING REQUIREMENTS

FIELD OF THE INVENTION

The invention relates generally to computer networks and, more particularly, to networks that support multicast messaging protocols.

BACKGROUND OF THE INVENTION

Known reliable multicast protocols typically require that each participant, or member, of a group buffer a received multicast message, to allow for retransmission of the message. This ensures delivery of the multicast message to all members, even if the sender of the message ultimately fails. A given member retains a received multicast message until the message is "stable," that is, until it becomes known that the message has been delivered to every member with at least a relatively high probability.

The multicast protocols operate in three phases. First, in an initial multicast phase, a sender multicasts the message over the group and attempts to provide the message to as many members as possible. Next, in a repair phase, the members detect message losses and request retransmission of the message from the sender or other members, as appropriate. Finally, in a garbage collection phase, the members release the buffer space assigned to the message once the message becomes stable. Most multicast protocols perform the repair and garbage collection phases using a combination of positive and/or negative acknowledgement messages.

Known epidemic multicast protocols use gossiping in the repair phase. Each member periodically selects another member at random and sends to that member a gossip message that includes a list of the messages that the gossiping member has retained in its buffer and/or has delivered. The selected member then determines if it has in its buffer any messages that are not on the list, that is, any messages that are lost to the gossiping member. If so, the selected member retransmits the lost messages to the gossiping member. Also, the selected member may request that the gossiping member retransmit any messages from the list that the selected member has not yet delivered, that is, any messages that are lost to the selected member. The members thus perform point-to-point repair.

The garbage collection phase of the epidemic multicast protocol is typically performed by having each member release the buffer space allocated to a given message a predetermined time after the member delivers the message. The predetermined time is based on a prediction of how long it takes to disseminate a lost message to the membership through gossiping. Accordingly, the predetermined time the message must be retained depends largely on the number of members in the group.

As the number of members in the group increases, the time to both accomplish and detect message stability increases. Further, depending on the application, the combined rate of sending may also increase as the size of the membership increases. Accordingly, each member must buffer more and more messages at any given time, which means that each member must maintain and operate larger and larger buffers. These multicast protocols thus do not scale well.

SUMMARY OF THE INVENTION

A scalable multicast protocol includes a mechanism that allows a given multicast message to be stored by a subset of the entire group membership. The buffered messages are spread over the membership, so that any given member buffers only a portion of the messages.

More specifically, a subset of "C" members buffers a multicast message, where C is selected to reduce to an acceptable level the probability that a given message will be lost before it reaches at least one of the C members. When a member receives a multicast message, the member determines whether or not it should buffer the message by manipulating a string of bytes that is unique to both the message and the member. In the exemplary system, the byte string, which consists of a message identifier that is included in the message and the member's address, is manipulated in accordance with a hash function. As discussed in more detail below, the member buffers the message if the result is less than $C/n$, where n is the number of known members. A member that buffers a message is hereinafter referred to as a "bufferer" of the message.

When one of the C bufferers receives a gossip message that indicates that the multicast message has been lost to the gossiping member, the bufferer retransmits the message to the gossiping member. When, however, a member that is not one of the C bufferers receives such a gossip message, the member determines which members are bufferers of the lost message and requests that one of the bufferers retransmit the message to the gossiping member.

The selected member identifies the bufferers by manipulating the message identifier associated with the lost message and the respective addresses of the members known to the selected member. The selected member then picks one of the identified bufferers at random, and sends to it a request for retransmission that identifies the message and specifies the gossiping member as the destination address. The bufferer that receives the request then retransmits the lost message to the gossiping member, assuming that the selected bufferer has not already released the buffer space allocated to the message. The members then continue to gossip and the lost message should, with very high probability, be supplied to all of the members by the bufferers through this process.

The system trades off reduced buffer space at each member against an increase in traffic due to the sending of requests for retransmission. In a system with a low probability of lost messages, there is a relatively small increase in the associated traffic, and a rather significant reduction in required buffer space at each member. Further, as the size of the membership increases, the size of the buffer decreases since the number of members that buffers a given message, C, is essentially fixed.

The multicast protocol may further include a mechanism to detect, in the initial phase of the multicast operation, "catastrophic failures" in which none or few of the members receive a multicast message. Each member includes the buffer discussed above and a relatively small, fixed-size "short-term" buffer that holds a limited number of the received messages in the order in which the messages are received. A member monitors any holes or gaps in the sequences of incoming messages, and detects a catastrophic failure when a received gossip message identifies one of the same holes or gaps, as discussed in more detail below.

When such a failure is detected, the member sends a request for multicast retransmission of the associated missing message to the sender, and the sender again multicasts the message to the group. If a catastrophic failure has occurred, the multicast retransmission request is sent relatively soon after the initial transmission, and thus, the request for multicast retransmission can be handled from the sender's short term buffer. If the initial multicast transmission did not involve a catastrophic failure, the point-to-point repair is handled in the manner discussed above.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
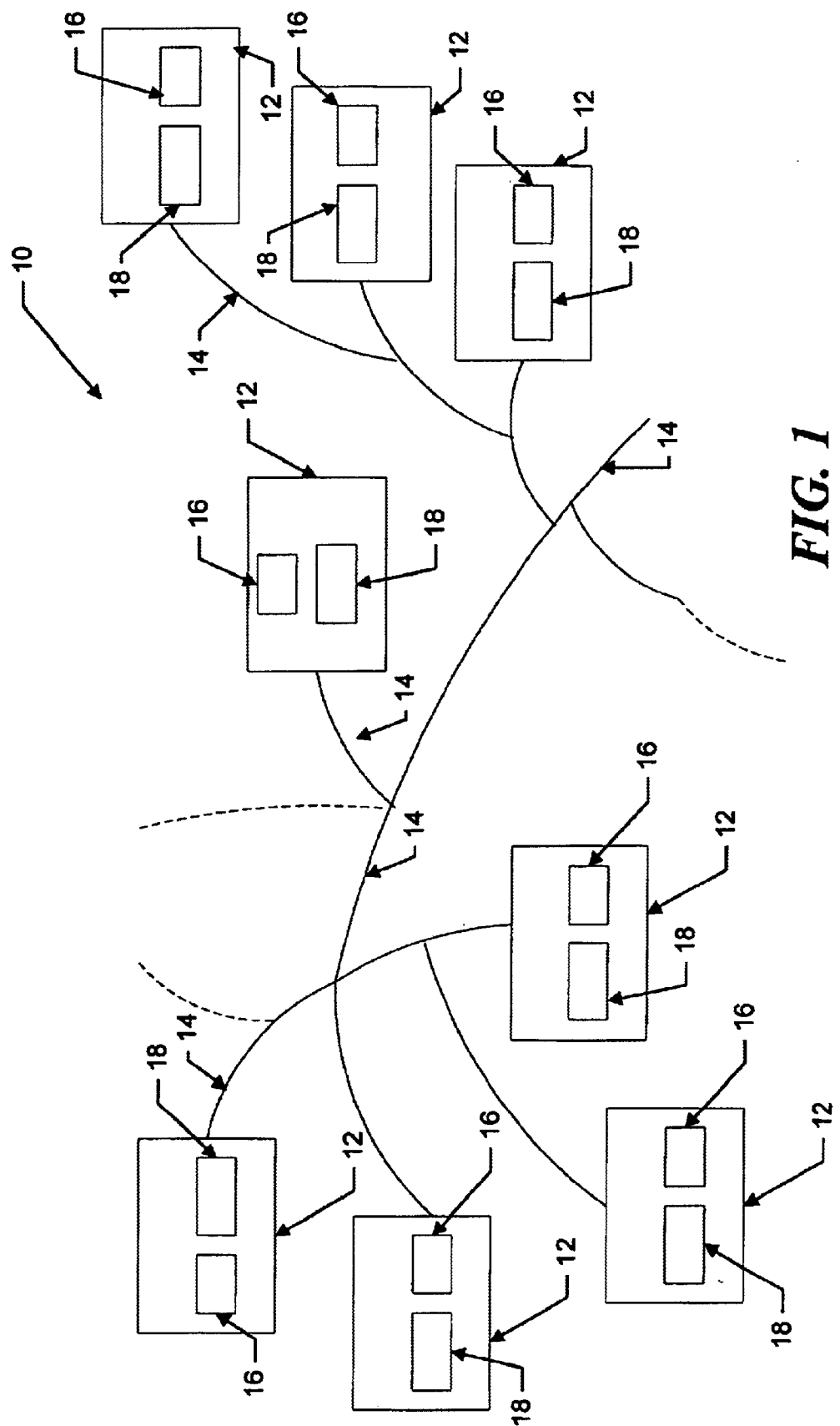
FIG. 1 is a functional block diagram of a system that operates in accordance with the invention.

Referring to FIG. 1, the system includes one or more groups 10, with the drawing depicting a single group. The group includes a plurality of members 12 that communicate with one another over communications paths 14, by sending messages point-to-point, gossiping and multicasting messages over the group.

To facilitate communication, each member maintains a list 16 of the addresses of the other members. The list maintained by a given member includes the addresses of those members that are known to the given member through, for example, gossiping. Accordingly, the list maintained by one member may at times differ from the list maintained by another member. The lists, however, will generally overlap to a large extent.

The members 12 use a multicast protocol which requires that only a subset of "C" members buffer a given message. As discussed in more detail below, the messages are spread out over the group, so that a given member buffers only a portion of the multicast messages in a buffer 18. A member that buffers a given message is referred to hereinafter as a "bufferer" of the message.

Figure 2:
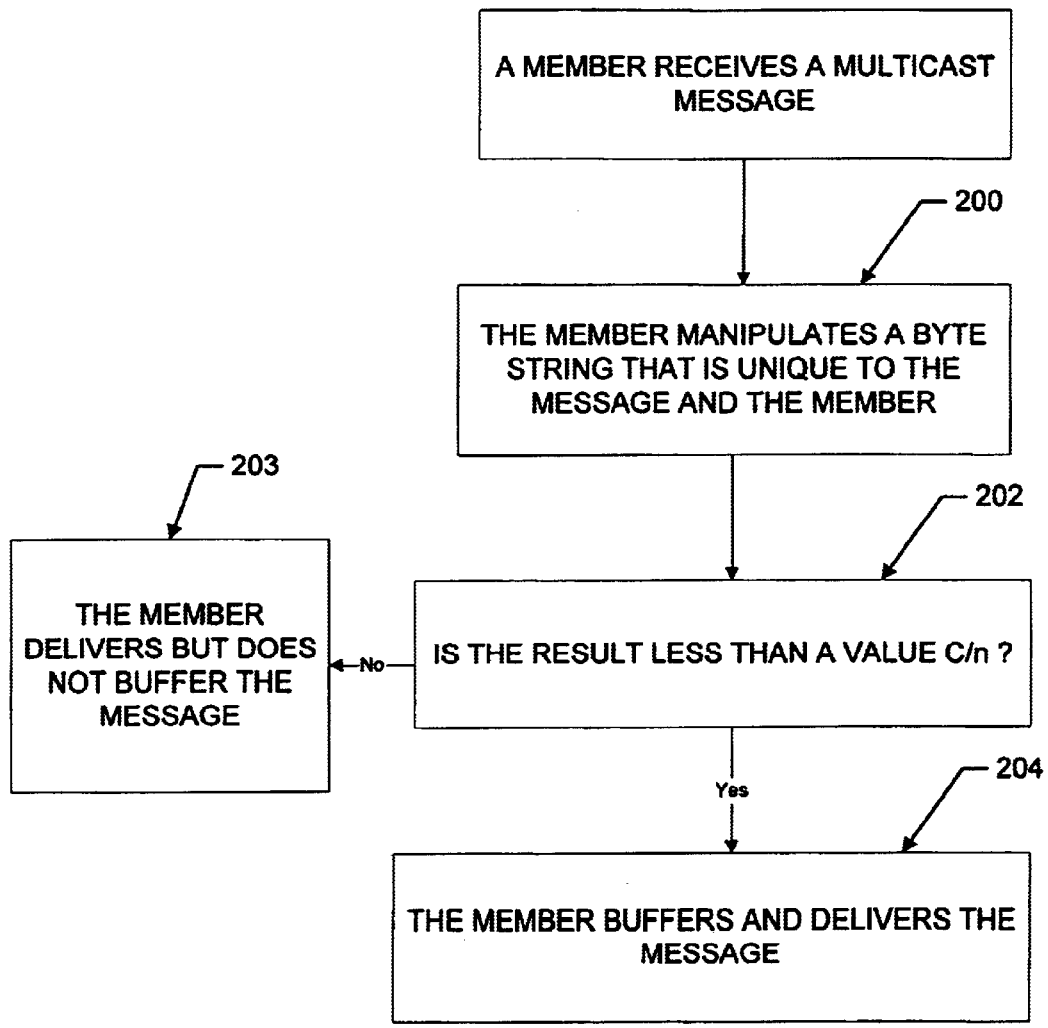
FIG. 2 is a flow chart of the multicast buffering operations of the system of FIG. 1.

Referring also to FIG. 2, each multicast message includes a unique identifier that in the exemplary system consists of the source, or sender's, address and a message sequence number. As is known to those skilled in the art, each member of a group is assigned an address that is unique over at least the group.

When a member receives a multicast message, the member determines if it should buffer the message by manipulating a string of bytes that is unique to both the message and the receiving member (steps 200). In the exemplary system, the receiving member manipulates a string of bytes consisting of its own address and the message identifier that is included in the message. If the result is less than C/n, where n is the number of members known to the receiving member, the receiving member both buffers and delivers the message (steps 202, 204). Otherwise, the receiving member delivers but does not buffer the message (steps 202, 203).

Figure 3:
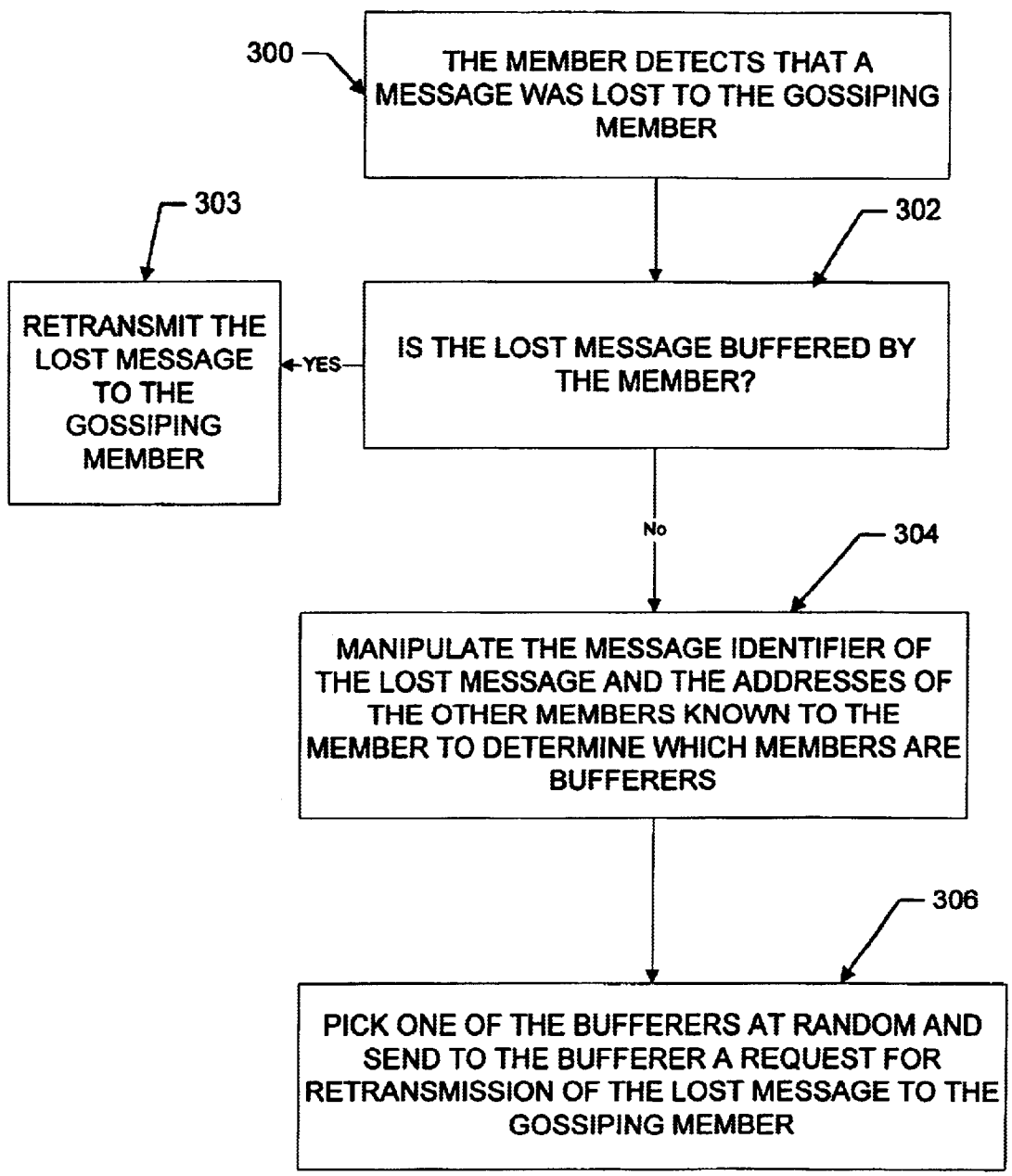
FIG. 3 is a flow chart of the operations of the system of FIG. 1 during the repair phase of the multicast protocol.

Referring also to FIG. 3, the members periodically gossip about the multicast messages they have delivered. A member thus periodically selects another member at random and sends to the selected member a gossip message that includes a list of delivered multicast messages. The selected member then determines if it has delivered a message that has not been delivered by the gossiping member, that is, if any multicast messages have been lost to the gossiping member (step 300).

If a lost message is detected and the selected member is a bufferer of that message, the selected member retransmits the message to the gossiping member (steps 302, 303). Otherwise, the selected member identifies the bufferers of the message from the list of members known to the selected member (step 304). The selected member thus manipulates byte strings that consist of the message identifier and the respective addresses of the known members, and identifies as bufferers those members associated with results that are less than C/n. The selected member then picks one of the identified bufferers at random and sends to it a request for retransmission that identifies the lost message and specifies the gossiping member as the destination address (step 306). If the bufferer has the message in its buffer when it receives the request for retransmission, the bufferer retransmits the message to the gossiping member. Otherwise, the bufferer ignores the request.

If the lost message is not then retransmitted to the gossiping member by the bufferer, the process is repeated when the gossiping member sends its next gossip message.

The number, C, of bufferers is selected based on the probability of message loss for the group. The probability of message loss is calculated in a conventional manner and depends largely on the topology of the group and only somewhat on the number of members in the group. The number C is then selected such that the probability that the message fails to reach at least one bufferer is acceptably low.

The probability of message loss does not change significantly as members are added to the group. Accordingly, the value of C/n decreases as the number of members, n, increases. The members will thus be required to individually buffer fewer and fewer messages as the membership grows, and the C buffered messages are spread out over the larger group.

The way in which a member determines if it is a bufferer for a given message should be fair, in the sense that the results of the manipulation of different byte sequences should be unrelated. This ensures that approximately C members will be bufferers for a given message, and that the bufferers for all the messages will be spread over the group. The manipulation, which is performed for every received multicast message and when messages are lost, should also consume relatively little of the member's processing resources. A cryptographic hash function is fair, but is generally too processor intensive. Alternatively, a cyclic redundancy check uses little processing time, but is generally predictable, and thus, not fair.

In the exemplary system, a hash function that is based on a "shuffle table" is used. The shuffle table is a table of X randomly chosen integers that is entered once for each byte of the byte string. In the exemplary system the shuffle table contains 256 entries.

Figure 4:
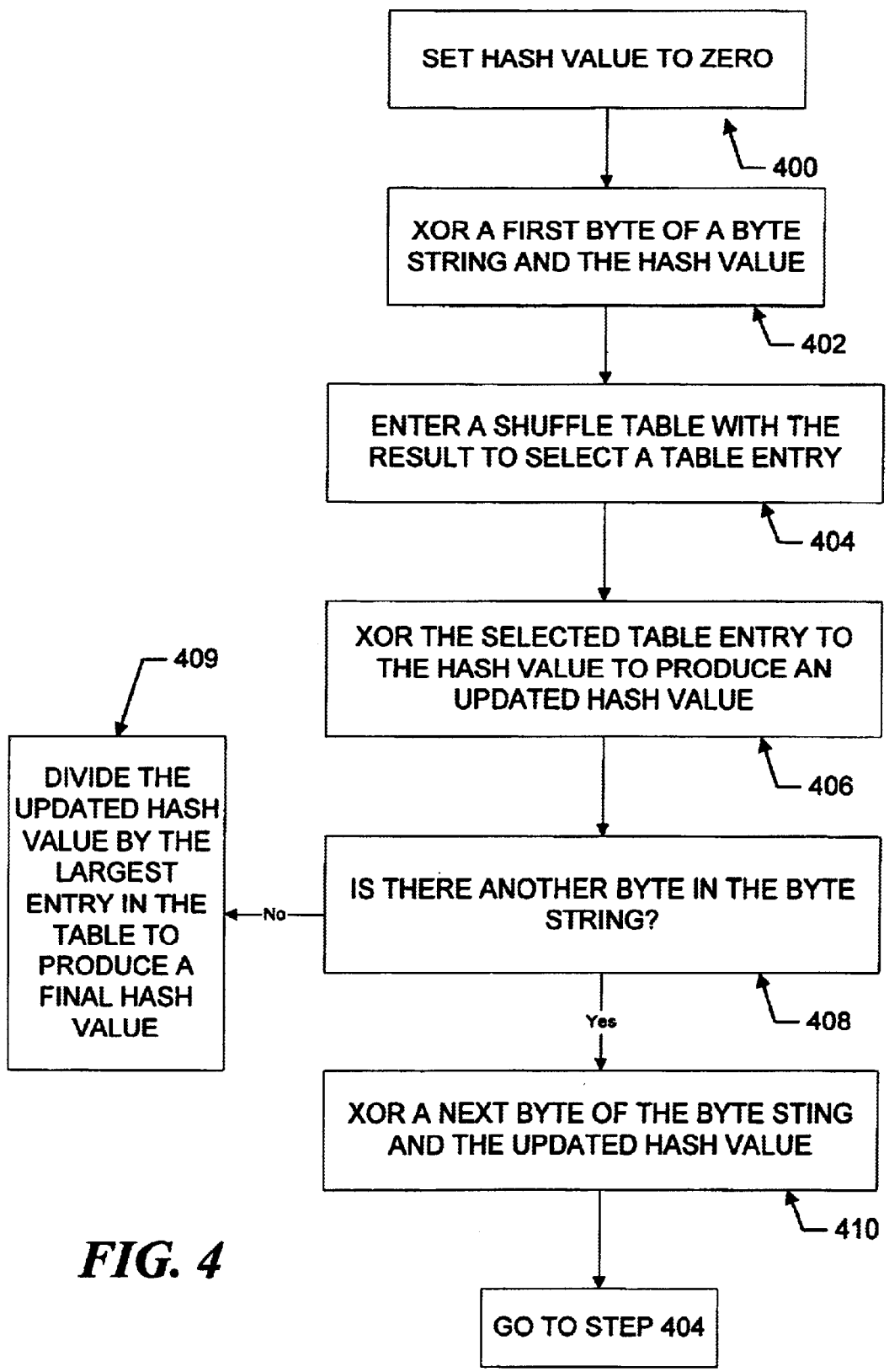
FIG. 4 is a flow chart of a manipulation operation performed during the operations of FIG. 3.

Referring now to FIG. 4, at the start of the manipulation, the hash value is set to zero (step 400). Next, the first byte of the byte sequence is XOR'd with the last significant byte of the hash value. The result is then used to enter the shuffle table (steps 402, 404). The hash function next XORs the selected table entry and the hash value, to produce an updated hash value (step 406). The next byte of the byte string is then XOR'd with the least significant byte of the updated hash value, and the table is again entered with the result. The selected table entry is XOR'd to the updated hash value, to produce a next updated hash value, and so forth, until all the bytes of the string have been manipulated (steps 406, 408, 410). The updated hash value, which is essentially a random sequence of "b" bits, is next divided by the integer $2^n$ to produce a final hash value that is between zero and one (step 409). The hash function is relatively fair, since the final hash values for different byte strings are unrelated due to the inclusion of the shuffle table entries. Also, the hash function is not processor intensive, since it involves performing only XOR operations and entering a single, relatively small, lookup table.

The same hash function is used during the repair phase when a member determines which members are bufferers for a given message. Each byte string involved includes the message identifier and an address of one of the other known members. The intermediate hash value produced after manipulation of the message identifier is the same for each of these byte strings. Accordingly, the selected member may use this intermediate hash value and further manipulate the bytes of the various member addresses, to produce the associated final hash values associated with the list of members. The selected member then compares the final hash values with C/n, to determine which of the known members are bufferers, as discussed above.

Figure 5:
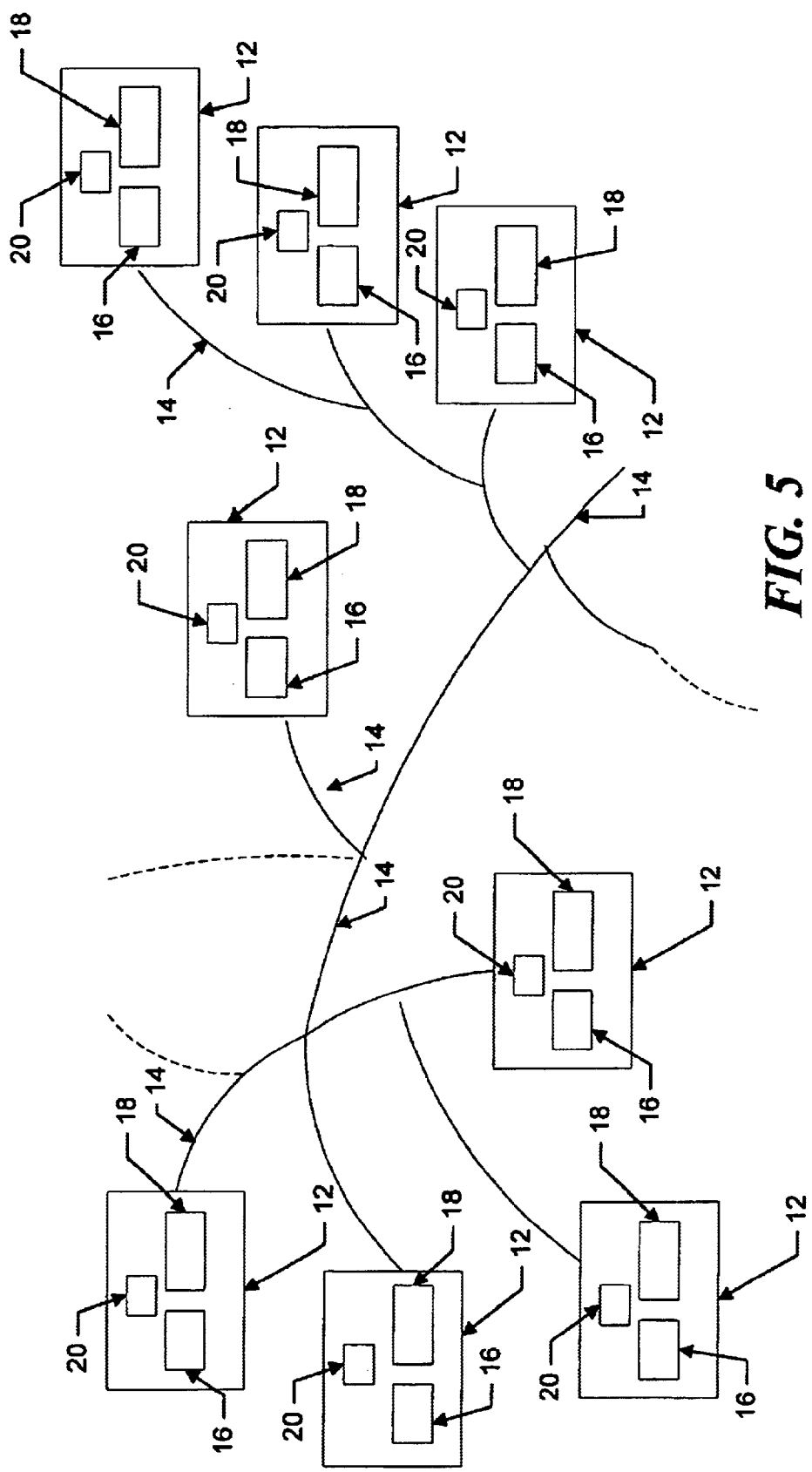
FIG. 5 is a functional block diagram of a system that detects catastrophic failures in the initial multicast phase.
Figure 6:
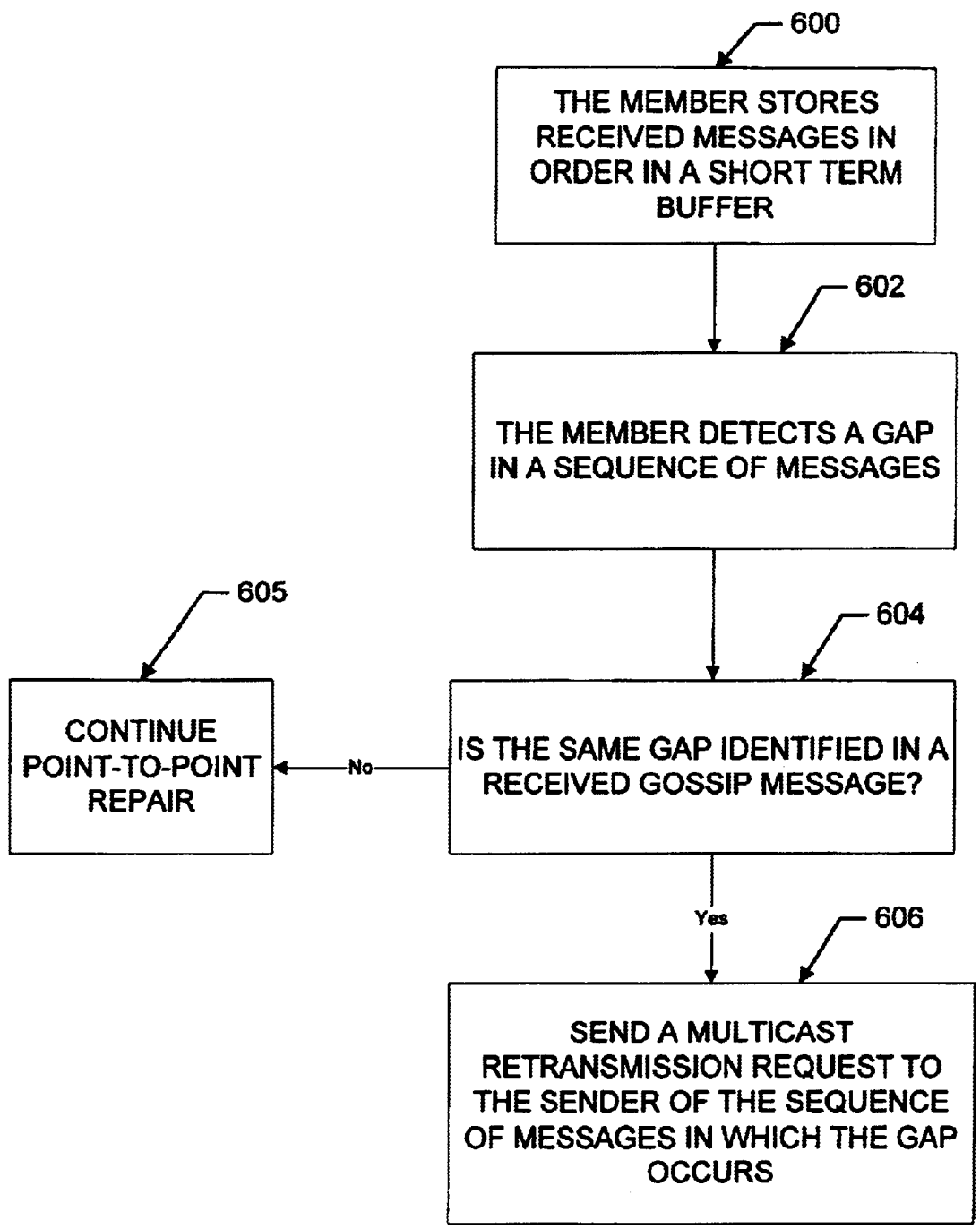
FIG. 6 is a flow chart of the failure detection operations of the system of FIG. 5.

Referring now to FIGS. 5 and 6, the system may include a mechanism to detect, during the initial multicast phase "catastrophic failures" in which none or few of the members receive the message. Each member thus includes, in addition to the buffer 18 discussed above with reference to FIGS. 1–4, a "short term" buffer 20 that holds a limited number of received multicast messages in the order in which the messages are received. The short term buffer 20 holds each received message for a relatively short time for catastrophic failure recovery, while the buffer 18 holds a portion of the received messages for the longer time associated with point-to-point repair. The size of the short term buffer is independent of group size, and depends instead on the overall rate of message transmission.

During the initial multicast phase, each member holds in the short term buffer 20 every multicast message it receives, in the order in which the messages are received (step 600). If the short term buffer is full when a next message is received, the member overwrites the earliest buffered message. The member also determines if it is a bufferer of the received message, and stores the message in the buffer 18 accordingly. Each member further detects "holes" or gaps in the message sequence numbers of the incoming messages (step 602). The members then include information about the gaps in the gossip messages that they send to randomly selected members. When a selected member receives a gossip message that identifies one of the holes that was also detected by the selected member, the member sends a multicast retransmission request to the sender (steps 604, 606). In response, the sender multicasts the message from its short term buffer to the entire group.

If a catastrophic failure has occurred, there is a relatively high probability that the selected members and the gossiping members will readily detect the same hole. The failure will thus be detected relatively quickly after the initial multicast transmission, and presumably be corrected when the sender resends the multicast message from its short term buffer. The associated point-to-point repair will thus be minimized. Further, the early detection and correction of the failure ensures that the underlying assumptions associated with a relatively low probability of message loss will be met, and thus, that the message will in all likelihood be received by at least one of the C bufferers as part of the initial phase multicast transmission.

If the multicast transmission did not involve a catastrophic failure, the multicast message will have been received by most members. There is thus a relatively low probability that the gossip messages will identify a hole in a message sequence that are also detected by the randomly selected recipients of the gossip messages. Accordingly, the original sender is not likely to receive a multicast retransmission request if a failure has not occurred. If a failure has occurred, it should be corrected relatively quickly in comparison to the dissemination of gossiped information. Accordingly, the sender should not be inundated with multicast retransmission requests.

The foregoing description has been limited to a specific embodiment of this invention. It will be apparent, however, that variations and modifications may be made to the invention, such as using the multicast protocol over a subgroup, with the attainment of some or all of its advantages. Therefore, it is the object of the appended claims to cover all such variations and modifications as come within the true spirit and scope of the invention.

What is claimed is:

1. A method of multicasting messages over a group of members in a network, the method including the steps of:
   A. multicasting the message over the group:
   B. determining, at one or more of the members receiving the message, if the one or more members are bufferers of the message by
      i. at each of the one or more members, manipulating a string of bytes that is unique to both the message and the member in accordance with a hash function by
         a. XOR'ing the respective bytes of the byte string with a hash value;
         b. entering a stored table with the results of step a and selecting a table entry;
         c. XOR'ing the selected table entry with the hash value to up date the hash value;
         d. repeating steps a–c for all of the bytes in the byte string, and
         e. dividing the result by a predetermined integer to produce a final hash value as the result;
      ii. determining if the result of the manipulation is less than a value calculated by the member;
   C. at the one or more members that are bufferers of the message, buffering and delivering the message;
   D. at the one or more members that are not bufferers of the message, delivering the message.

2. The method of claim 1 wherein the step of determining if the result of the manipulation is less than a value calculated by the member includes using as the calculated value C/n, where C is selected based on the probability of a lost message and n is the number of group members that are known to the member.

3. The method of claim 1 further including the steps of
   E. at one or more members storing received multicast messages in relatively small short term buffers;
   F. at a given member detecting a gap in a sequence of the received messages;
   G. including in a gossip message information that identifies the detected gaps;
   H. if a received gossip message identifies a gap that is also detected by the member that received the gossip message, sending to the source of the associated message sequence a request for a multicast retransmission of the message that corresponds to the detected gap; and I. at the source, multicasting the message over the group from the short term buffer.

4. The method of claim 3 wherein the size of the short term buffer is based on the rate of multicast message transmission for the group.

5. The method of claim 3 further including the steps of

J. selecting a member at random and sending to the selected member a gossip message that includes a list of messages delivered by a gossiping member;

K. determining at the selected member if a message is lost to the gossiping member;

L. for a lost message, retransmitting the message from the selected member to the gossiping member if the selected member is a bufferer of the lost message;

M. if the selected member is not a bufferer of the lost message, determining at the selected member which members are bufferers of the lost message and sending to one of the bufferers a request for retransmission of the lost message to the gossiping member.

6. A method of multicasting messages over a group of members in a network, the method including the steps of:

A. multicasting the message over the group;

B. determining, at one or more of the members receiving the message, if the one or more members are bufferers of the message by
  i. manipulating a string of bytes that is unique to the message and a given member,
  ii. determining the given member is a bufferer if the result of the manipulation is less than a calculated value C/n, where C is selected based on the probability of a lost message and n is a number of known group members;

C. at the one or more members that are bufferers of the message, buffering and delivering the message;

D. at the one or more members that are not bufferers of the message, delivering the message;

E. selecting a member at random and sending to the selected member a gossip message that includes a list of messages delivered by a gossiping member;

F. determining at the selected member if a message is lost to the gossiping member;

G. for a lost message, retransmitting the message from the selected member to the gossiping member if the selected member is a bufferer of the lost message;

H. if the selected member is not a bufferer of the lost message, determining at the selected member which members are bufferers of the lost message and sending to one of the bufferers a request for retransmission of the lost message to the gossiping member.

7. The method of claim 6 wherein the step of manipulating the string of bytes includes manipulating the bytes in accordance with a hash function.

8. The method of claim 7 wherein the hash function includes the steps of a. XOR'ing the respective bytes of the byte string with a hash value;

b. entering a stored table with the results of step a and selecting a table entry;

c. XOR'ing the selected table entry with the hash value to update the hash value;

d. repeating steps a–c for all of the bytes in the byte string; and e. dividing the result by a predetermined integer to produce a final hash value as the result.

9. A system of networked members, each member including:

A. message receivers for receiving messages;

B. a processor for determining if the member is a bufferer of a received multicast message by manipulating a string of bytes that is unique to both the message and the member, and, the processor including
  a. a first XOR gate for XOR'ing the respective bytes of the byte string with a hash value;
  b. a stored table that is entered with the result produced by the first XOR gate;
  c. a second XOR gate for XOR'ing the selected table entry with the hash value to update the hash value; and
  d. a divider, for dividing by a predetermined value the hash value produced by the second XOR gate after all of the bytes of the byte string are submitted to the first XOR gate, to produce the results the processor determining if the member is a bufferer if the result of the manipulation is less than a calculated value;

C. a buffer for retaining received multicast messages for which the member is a bufferer;

D. message delivering subsystems for delivering the received messages; and

E. a gossiping subsystem for
  i. determining from a received gossip message if a multicast message is lost to a gossiping member sending the gossip message
  ii. if the member is a bufferer of the lost message, retransmitting the lost message to the gossiping member,
  iii. if the member is not a buffer of the lost message, determining which members are bufferers and sending to one of the buffers a request to retransmit the lost message to the gossiping member.

10. The system of claim 9 wherein the processor determines if the result of the manipulation is less than a calculated value C/n, where C is selected based on the probability of a lost message and n is the number of group members that are known to the processor.

11. The system of claim 9 wherein
  a. further including at each member
    i. a relatively small short term buffer for retaining received multicast messages in the order in which the messages are received;
    ii. means for detecting a gap in a sequence of the received messages; and
  b. the gossiping subsystem further
    i. includes in a gossip message information that identifies the detected gaps, and
    ii. if a received gossip message includes information about a gap that is also detected by the member that received the gossip message, sending to a source of the messages associated with the gap a multicast retransmission request.

12. The system of claim 11 wherein the size of the short term buffer is based on the rate of multicast message transmission for the members.

* * * * *